US009734648B2

(12) United States Patent
Angus et al.

(10) Patent No.: US 9,734,648 B2
(45) Date of Patent: Aug. 15, 2017

(54) METHOD OF CATEGORISING DEFECTS IN A MEDIA ITEM

(71) Applicant: NCR Corporation, Duluth, GA (US)

(72) Inventors: Robin Angus, Fife (GB); Gary Ross, Edinburgh (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/711,228

(22) Filed: Dec. 11, 2012

(65) Prior Publication Data

US 2014/0158496 A1 Jun. 12, 2014

(51) Int. Cl.

| | |
|---|---|
| ***G07F 7/04*** | (2006.01) |
| ***G06K 7/00*** | (2006.01) |
| ***G06K 9/00*** | (2006.01) |
| ***G07D 7/00*** | (2016.01) |
| ***G07D 7/12*** | (2016.01) |
| ***G07D 7/16*** | (2016.01) |
| ***G07D 7/121*** | (2016.01) |
| ***G07D 7/08*** | (2006.01) |

(52) U.S. Cl.

CPC ............. *G07D 7/00* (2013.01); *G07D 7/0006* (2013.01); *G07D 7/008* (2013.01); *G07D 7/0046* (2013.01); *G07D 7/0073* (2013.01); *G07D 7/08* (2013.01); *G07D 7/12* (2013.01); *G07D 7/121* (2013.01); *G07D 7/122* (2013.01); *G07D 7/166* (2013.01)

(58) Field of Classification Search

CPC .......... G07D 7/12; G07D 7/121; G07D 7/122; G07D 7/168; G07D 7/00; G07D 7/0006; G07D 7/0013; G07D 7/002; G07D 7/0026; G07D 7/0033; G07D 7/004; G07D 7/0046; G07D 7/0053; G07D 7/006; G07D 7/0066; G07D 7/0073; G07D 7/008; G07D 7/0086; G07D 7/124; G07D 7/125; G07D 7/127; G07D 7/20; G07D 7/2008; G07D 7/2016; G07D 7/2025; G07D 7/2033; G07D 7/2041; G07D 7/205; G07D 7/2058; G07D 7/2066

USPC .................. 194/206, 207; 209/534; 382/135; 235/379; 250/556; 356/71, 77

See application file for complete search history.

(56) References Cited

U.S. PATENT DOCUMENTS

| | | | | |
|---|---|---|---|---|
| 4,398,088 | A * | 8/1983 | Hirose et al. | 235/379 |
| 6,142,284 | A * | 11/2000 | Saltsov | 194/207 |
| 6,435,329 | B1 * | 8/2002 | Amari et al. | 194/206 |
| 6,797,974 | B2 | 9/2004 | Philipp et al. | |
| 7,305,113 | B2 | 12/2007 | Yoshida et al. | |
| 7,929,749 | B1 * | 4/2011 | Jones et al. | 382/135 |

(Continued)

FOREIGN PATENT DOCUMENTS

| | | | |
|---|---|---|---|
| CN | 1538353 | A | 10/2004 |
| CN | 1818978 | A | 8/2006 |

(Continued)

*Primary Examiner* — Jeffrey Shapiro

(74) *Attorney, Agent, or Firm* — Schwegman, Lundberg & Woessner

(57) ABSTRACT

A media handler for detecting counterfeit media is described. The media handler comprises: a plurality of discrete sensors distributed along a transport path operable to transport a media item, and a controller operable to receive signals from the plurality of discrete sensors. The controller is also operable to make a decision on validity of the transported media item based on the received signals.

13 Claims, 2 Drawing Sheets

(56) References Cited

U.S. PATENT DOCUMENTS

| | | | | |
|---|---|---|---|---|
| 8,781,206 | B1 * | 7/2014 | Yacoubian | G07D 7/121 382/135 |
| 2002/0092800 | A1 * | 7/2002 | Philipp | G07D 7/121 209/534 |
| 2003/0210386 | A1 * | 11/2003 | Laskowski | 356/71 |
| 2003/0217906 | A1 * | 11/2003 | Baudat | G07D 7/128 194/207 |
| 2005/0056694 | A1 * | 3/2005 | Kako et al. | 235/379 |
| 2005/0121287 | A1 * | 6/2005 | Giering et al. | 194/207 |
| 2005/0181695 | A1 * | 8/2005 | Yoshimura et al. | 442/286 |
| 2006/0016883 | A1 * | 1/2006 | Silva et al. | 235/381 |
| 2006/0177117 | A1 | 8/2006 | Morisaki et al. | |
| 2006/0254877 | A1 * | 11/2006 | Mulvey | 194/302 |
| 2007/0114108 | A1 * | 5/2007 | Richards | G07F 5/18 194/344 |
| 2007/0216976 | A1 * | 9/2007 | Endo | G03H 1/0011 359/2 |
| 2008/0041941 | A1 * | 2/2008 | Talwerdi et al. | 235/382 |
| 2008/0047802 | A1 * | 2/2008 | Nireki | B65H 43/00 194/302 |
| 2008/0150224 | A1 * | 6/2008 | Shimizu et al. | 271/263 |
| 2009/0057095 | A1 * | 3/2009 | Chien | G07D 7/121 194/302 |
| 2009/0159662 | A1 * | 6/2009 | Lee et al. | 235/379 |
| 2010/0000838 | A1 * | 1/2010 | Hamasaki | 194/207 |
| 2010/0060881 | A1 * | 3/2010 | Kayani | 356/72 |
| 2010/0198396 | A1 * | 8/2010 | Brexel et al. | 700/219 |
| 2010/0259749 | A1 * | 10/2010 | Zoladz | G02B 6/0038 356/71 |
| 2010/0282566 | A1 * | 11/2010 | Zoladz | G07D 7/121 194/302 |
| 2011/0061988 | A1 * | 3/2011 | Lonsdale | G07D 7/12 194/303 |
| 2011/0139575 | A1 * | 6/2011 | Voser | G07D 7/00 194/317 |
| 2012/0285787 | A1 * | 11/2012 | Hosokawa et al. | 194/206 |
| 2013/0081923 | A1 * | 4/2013 | Frady et al. | 194/302 |

FOREIGN PATENT DOCUMENTS

| | | |
|---|---|---|
| CN | 102456246 A | 5/2012 |
| EP | 2 428 766 | 3/2012 |
| EP | 1 484 719 | 12/2012 |
| TW | 626162 B | 4/2003 |

* cited by examiner

METHOD OF CATEGORISING DEFECTS IN A MEDIA ITEM

FIELD OF INVENTION

The present invention relates to counterfeit media detection.

BACKGROUND OF INVENTION

It is important to be able to detect counterfeit media when such media is deposited into a self-service terminal, such as when counterfeit banknotes are inserted into an automated teller machine (ATM) equipped with automated banknote validation technology. Such automated banknote validation technology typically includes high resolution line sensors. These sensors are expensive.

There is now a requirement to detect counterfeit banknotes as they are being dispensed from ATMs. This requirement has arisen because some ATM replenishers have been accessing currency cassettes to be inserted into an ATM and fraudulently substituting counterfeit banknotes for valid banknotes in those currency cassettes.

It is not practical to include banknote validation technology in every ATM because such technology is expensive and would significantly increase the transaction time for each currency dispense transaction.

It would be advantageous to have a low-cost banknote validator that does not significantly increase transaction time.

SUMMARY OF INVENTION

Accordingly, the invention generally provides methods, systems, apparatus, and software for media validation, the apparatus comprising: a plurality of discrete sensors distributed along a transport path, and a controller operable to receive signals from the plurality of discrete sensors and to make a decision on validity of a transported media item based on the received signals.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a media handler for detecting counterfeit media, the media handler comprising: a plurality of discrete sensors distributed along a transport path operable to transport a media item, and a controller operable to receive signals from the plurality of discrete sensors and to make a decision on validity of the transported media item based on the received signals.

The transport path may comprise a banknote dispense path operable to pick media items from a currency cassette and to dispense those picked media items to a customer. The discrete sensors may be distributed along a transport path between (i) a pick area adjacent a pick unit, and (ii) a media item divert area in the vicinity of (or adjacent to) a purge container. The discrete sensors may not all be housed within a single module. This allows the sensors to be moved relative to each other, so that each media handler does not sense the same part of a media item as other media handlers of the same design. This ensures that counterfeiters cannot merely provide a genuine portion of a media item at a location on the media item corresponding to the position of the discrete sensors.

Optionally, the transport path may comprise a banknote deposit path operable to receive media items from a customer and to deposit those received media items into a media item container.

Optionally, the transport path may comprise a bi-directional banknote dispense and deposit path operable to receive media items from a customer and to dispense media items to a customer.

The discrete sensors may comprise two or more of the following types of discrete sensor: a UV sensor, an IR sensor, a sensor generally operable in a green portion of the electro-magnetic visible spectrum, a sensor generally operable in a red portion of the electro-magnetic visible spectrum, a sensor generally operable in a blue portion of the electro-magnetic visible spectrum, and an ultrasonic sensor.

The discrete sensors may comprise spot sensors (as opposed to line sensors that are typically more expensive).

The discrete sensors may sense transmission through, or reflection from, the media item.

The discrete sensors may be offset laterally from each other so that each discrete sensor senses a different portion of a surface of the media item.

One or more of the discrete sensors may be used instead of a track sensor so that the discrete sensor is used to indicate if a transported media item is present or skewed.

A discrete ultrasonic sensor may be used as part of the discrete sensor arrangement and also to detect multiple media item picks being transported as a single media item.

The controller may be operable to divert the transported media item if any of the discrete sensors indicates that the media item does not correspond to a valid media item. Since counterfeit banknotes inserted into a currency cassette are typically very low quality, the sensors may be used to detect the presence or absence of the appropriate radiation (for example, if infra-red is absorbed or not, or if ultra-violet is absorbed or not).

Alternatively, the controller may be operable to aggregate the signals received from the discrete sensors and apply artificial intelligence (using, for example, fuzzy logic, an artificial neural network, or the like) to ascertain if the media item is counterfeit.

Each of the discrete sensors may comprise a circuit board on which is mounted a transmitter and receiver. The transmitter and receiver may be integrated into a single device (for example, a transceiver), or implemented as two (or more) devices (for example, each discrete sensor may comprise a transmitter/receiver pair, or may comprise more transmitters than receivers, or vice versa).

According to a second aspect there is provided a method of detecting counterfeit media, the method comprising: picking a media item from a media item container; sensing the media item at a first position on a transport path using a first circuit; transporting the media item; sensing the media item at a second position on a transport path using a second circuit; transporting the media item; sensing the media item at a third position on a transport path using a third circuit; and diverting the media item to a reject container (also called a purge container) in the event that one of the circuits indicates that the media item is a counterfeit.

The step of sensing the media item at a third position on a transport path using a third circuit may include the further step of using an ultrasonic sensor to detect the media item.

The method may further comprise the step of: diverting the media item to a reject container in the event that one of the circuits indicates that the media item comprises a plurality of media items being transported as a single item.

According to a third aspect there is provided a currency dispenser operable to detect counterfeit banknotes, the currency dispenser comprising: a pick unit operable to pick individual media items from a currency cassette; a transport path operable to transport a media item from the pick unit to a dispense port; a first sensor located at the transport path near to the pick unit; a second sensor located at the transport path and longitudinally spaced apart from the first sensor; and a controller operable to divert the transported banknote in the event that one of the sensors indicates that the banknote is counterfeit.

The second sensor may be laterally offset from the first sensor.

The currency dispenser may comprise a third sensor located at the transport path near a diverter.

According to a fourth aspect of the present invention there is provided a cash dispenser comprising a plurality of sensors mounted along a transport path and coupled to a controller operable to make a validity decision about a transported banknote based on the outputs of the plurality of sensors.

The validity decision may be made in real time without slowing down the banknote transport speed.

The validity decision may be made as the banknote is being transported. The plurality of sensors may be located on each of two sides of a corner around which the transport path conveys the banknote.

According to a fifth aspect of the present invention there is provided a method of retro-fitting a cash dispenser by mounting a plurality of sensors in spaced relation along an existing banknote transport path and providing a controller operable to receive signals from the plurality of sensors and to detect counterfeit banknotes as they are being transported along the transport path.

The controller may be operable to detect counterfeit banknotes as they are being transported along the transport path without slowing down the speed of transport of the banknotes.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
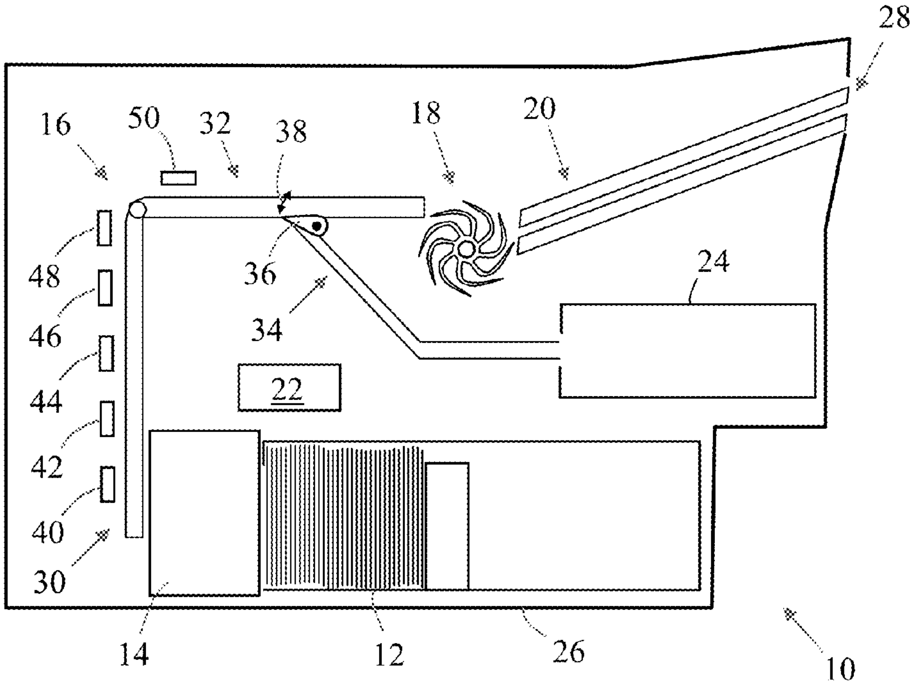
FIG. 1 is a simplified schematic diagram of a media handler, in the form of a banknote dispenser, according to one embodiment of the present invention.

Reference is first made to FIG. 1, which is a simplified schematic diagram of a media handler 10, in the form of a banknote dispenser, according to one embodiment of the present invention.

The banknote dispenser 10 comprises: a removable currency cassette 12; a pick unit 14; a transport path 16; a stacker wheel 18; a presenter path 20; a controller 22, and a purge (or reject) bin 24. These components are all housed within a chassis 26.

The chassis 26 defines an exit port 28 at an end of the presenter path 20 opposite the stacker wheel 18.

The transport path 16 comprises an upright portion 30 for receiving a picked banknote from the pick unit 14, a generally horizontal portion 32 for conveying a picked banknote to the stacker wheel 18, and an inclined section 34 for conveying a picked banknote to the purge bin 24. The transport path 16 and the stacker wheel 18 are conventional components of a currency dispenser.

The destination of a picked banknote (the stacker wheel 18 or the purge bin 24) depends on the position of a pivoting divert gate 36. The pivoting divert gate 36 moves (in response to a signal from the controller 22) in the direction shown by double-headed arrow 38.

As is known to those of skill in the art, the transport path 16 includes belts, skid plates, and/or gear trains to transport banknotes from the pick unit 14 to either the stacker wheel 18 (under normal conditions) or to the purge bin 24 (if an exception occurs, as will be described in more detail below).

Figure 2:
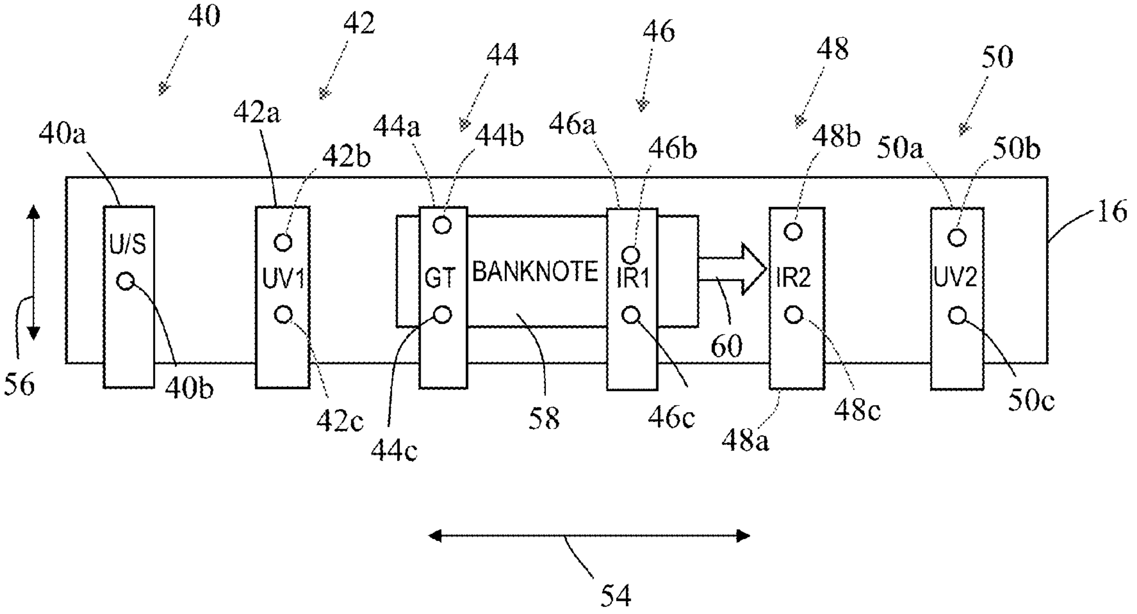
FIG. 2 is a simplified schematic diagram illustrating discrete sensors mounted in the banknote dispenser of FIG. 1.

A plurality of discrete sensors are located at different points along the transport path 16, as will now be described with reference to FIG. 2, which is a simplified schematic diagram illustrating the positions of six discrete sensors 40 to 50 disposed along the transport path 16. In FIG. 2, the transport path 16 is illustrated in a linear manner for simplicity of illustration. In FIG. 2, the longitudinal direction is illustrated by double-headed arrow 54 and the lateral direction is illustrated by double-headed arrow 56. The direction of motion of a banknote 58 is shown in FIG. 2 by arrow 60.

Each of the discrete sensors comprises a circuit board on which is mounted a transmitter and receiver. The transmitter and receiver may be in the form of an integrated transceiver, for example, where the sensor measures reflectance. Alternatively, the transmitter and receiver pair may comprise a separate transmitter and receiver, for example, where the sensor measures transmission. Each discrete sensor circuit board is connected to the controller 22 and sends signals thereto indicative of measurements taken from a banknote travelling along the transport path 16 as it passes that discrete sensor.

As illustrated in FIG. 2, the first discrete sensor 40 comprises a first circuit board 40_a_ on which is mounted (i) an ultrasonic sensor 40_b_. The ultrasonic sensor 40_b_ can detect multiple superimposed banknotes being transported as a single banknote (which occurs when an accidental double pick happens). Thus, the ultrasonic sensor 40_b_ can replace a conventional multiple banknote detector, which is used in ATMs.

The ultrasonic sensor 40*b* can also detect when multiple parts of a banknote are adhered to form a single composite banknote (which is a known type of counterfeiting activity). Thus, ultrasonic sensor 40*b* has the advantage that it can detect a single banknote composed of multiple banknote (and/or non-banknote) portions.

Unlike optical sensors, an ultrasonic sensor does not confuse a transparent window in a banknote with absence of a banknote. This is advantageous because a transparent window is included in some banknote designs, particularly where the banknote substrate is made from a polymer.

The second discrete sensor 42 is longitudinally spaced apart from the first discrete sensor 40. The second discrete sensor 42 is "downstream" of the first discrete sensor 40 in that the banknote 58 passes the first discrete sensor 40 before it passes the second discrete sensor 42. The second discrete sensor 42 comprises a second circuit board 42*a* on which is mounted (i) an ultra-violet (UV) reflective transceiver 42*b* and (ii) a position sensor 42*c* (in the form of a white LED transceiver). The UV transceiver 42*b* is laterally spaced apart from both the ultrasonic sensor 40*b* on the first circuit board 40*a*, and the position sensor 42*c* on the second circuit board 42*a*. The UV transceiver 42*b* emits radiation at approximately 365 nm. The UV transceiver 42*b* performs two functions. The first function is to validate the banknote 58 as it is transported across the first discrete sensor 42. The second function is to operate as a position sensor (complementary to position sensor 42*c*).

The position sensor 42*c* (in common with the other position sensors described below) is a conventional sensor that is used to detect if the banknote 58 is correctly located on the transport path 16.

The third discrete sensor 44 is downstream of the first and second discrete sensors 40, 42. The third discrete sensor 44 comprises a third circuit board 44*a* (which straddles the transport path 16; that is, it is both above and below the transport path 16). On an upper part of the third circuit board 44*a* (the part above the transport path 16), a green transmissive emitter (not shown individually) is mounted; and on a lower part of the third circuit board 44*a* (the part below the transport path 16), a green transmissive receiver (not shown individually) is mounted. The numeral 44*b* refers to the combined green transmissive emitter/receiver pair.

The combined green transmissive emitter/receiver pair 44*b* is mounted laterally offset from both the ultrasonic sensor 40*b* and the UV transceiver 42*b*. This is to ensure that a different part of the banknote 58 is measured by each of these sensors.

A position sensor 44*c* (in the form of a white LED transceiver) is also mounted on the third circuit board 44*a*, offset from the green transmissive emitter/receiver pair 44*b*.

In a similar manner to the UV transceiver 42*b*, the green transmissive emitter/receiver pair 44*b* also performs the two functions of banknote validation and position sensing. The green transmissive emitter/receiver pair 44*b* emits radiation at approximately 510 nm.

The fourth discrete sensor 46 is downstream of the first to third discrete sensors 40, 42, 44. The fourth discrete sensor 46 comprises a fourth circuit board 46*a* on which is mounted (i) a first infra-red (IR) reflective transceiver 46*b* and (ii) a position sensor 46*c* (in the form of a white LED transceiver), laterally spaced apart from the first IR transceiver 46*b*. The first IR transceiver 46*b* emits radiation at approximately 930 nm. The first IR transceiver 46*b* has two functions. The first function is to validate the banknote 58 as it is transported across the fourth discrete sensor 46. The second function is to operate as a position sensor (complementary to position sensor 46*c*).

The first IR transceiver 46*b* is mounted laterally offset from (i) the ultrasonic sensor 40*b*, (ii) the UV transceiver 42*b*, and (iii) the combined green transmissive emitter/receiver pair 44*b*. This is to ensure that a different part of the banknote 58 is measured by each of these sensors.

The fifth discrete sensor 48 is downstream of the first to fourth discrete sensors 40 to 46. The fifth discrete sensor 48 comprises a fifth circuit board 48*a* on which is mounted a second IR reflective transceiver 48*b* and (ii) a position sensor 48*c* (in the form of a white LED transceiver), laterally spaced apart from the second IR transceiver 48*b*. The second IR transceiver 48*b* is laterally offset from (i) the ultrasonic sensor 40*b*, (ii) the UV transceiver 42*b*, (iii) the combined green transmissive emitter/receiver pair 44*b*, and (iv) the first IR transceiver 46*b*.

The second IR transceiver 48*b* emits radiation at approximately 800 nm. The second IR transceiver 48*b* has two functions: (i) banknote validation, and (ii) position sensing.

The sixth discrete sensor 50 is downstream of the first to fifth discrete sensors 40 to 48. The sixth discrete sensor 50 comprises a sixth circuit board 50*a* on which is mounted (i) a second ultra-violet (UV) reflective transceiver 50*b* and (ii) a position sensor 50*c* (in the form of a white LED transceiver). The second UV transceiver 50*b* emits radiation at approximately 254 nm. In a similar manner to the first UV transceiver 42*b*, the second UV transceiver 50*b* also performs the two functions of banknote validation and position sensing.

The second UV transceiver 50*b* is mounted laterally offset from (i) the ultrasonic sensor 40*b*, (ii) the first UV transceiver 42*b*, (iii) the combined green transmissive emitter/receiver pair 44*b*, (iv) the first IR transceiver 46*b*, and (v) the second IR transceiver 48*b*. This is to ensure that a different part of the banknote 58 is measured by each of these sensors; thereby ensuring that a good quality counterfeit (or even part of a real banknote) at one part of the banknote is unlikely to be validated by all of the discrete sensors.

All six discrete sensors 40 to 50 are mounted adjacent the transport path 16 and between the pick unit 14 and the pivoting divert gate 36.

The operation of the media handler 10 will now be described with reference to FIG. 3, which is a flowchart 100 illustrating the operation of the banknote dispenser 10 when a banknote being dispensed is validated by the discrete sensors 40 to 50.

Initially, the controller 22 receives a command to pick a banknote from the currency cassette 12 (step 102).

The pick unit 14 picks a banknote (the banknote 58) (step 104) in response to an instruction from the controller 22, and then the controller 22 actuates motors (not shown) to move the picked banknote along the transport path (step 106).

When a leading edge of the picked banknote 58 reaches the first discrete sensor 40 this is detected by the ultrasonic sensor 40*b* (step 108).

The ultrasonic sensor 40*b* then takes a measurement from a portion of the banknote that is in registration with it (that is, in registration with the ultrasonic sensor 40*b*) as the banknote 58 passes under the ultrasonic sensor 40*b* (step 110).

The first discrete sensor 40 then transmits the measurements to the controller 22 (step 112).

The controller 22 then ascertains if this is the last discrete sensor (step 114). Each of the discrete sensors has a unique identification, which is transmitted together with the measurements it has taken from the banknote 58. The controller 22 is programmed so that it knows that the sixth discrete sensor 50 is the last sensor, so when the unique identification from the sixth discrete sensor 50 is received, the controller 22 knows that the last discrete sensor has been reached.

If the last discrete sensor has not been reached, then the flow returns to step 106 (that is, the controller 22 continues transporting the banknote 58).

If the last discrete sensor has been reached, then the controller 22 processes all of the received measurements from the six discrete sensors (step 116) to ascertain if the banknote is valid (step 118).

If one or more of the six discrete sensors 40 to 50 indicates that the banknote 58 is not valid (or if multiple banknotes are present) then the controller 22 activates the pivoting divert gate 36 (step 120).

The banknote 58 (which may actually comprise multiple superimposed banknotes transported erroneously as a single banknote) is then routed to the purge bin 24 via the inclined section 34 (step 122).

If all of the six discrete sensors 40 to 50 indicate that the banknote 58 is valid (which includes no multiple banknotes being present), or at least not invalid based on the measurements taken, then the controller 22 transports the banknote 58 to the stacker wheel 18 (step 124).

Figure 3:
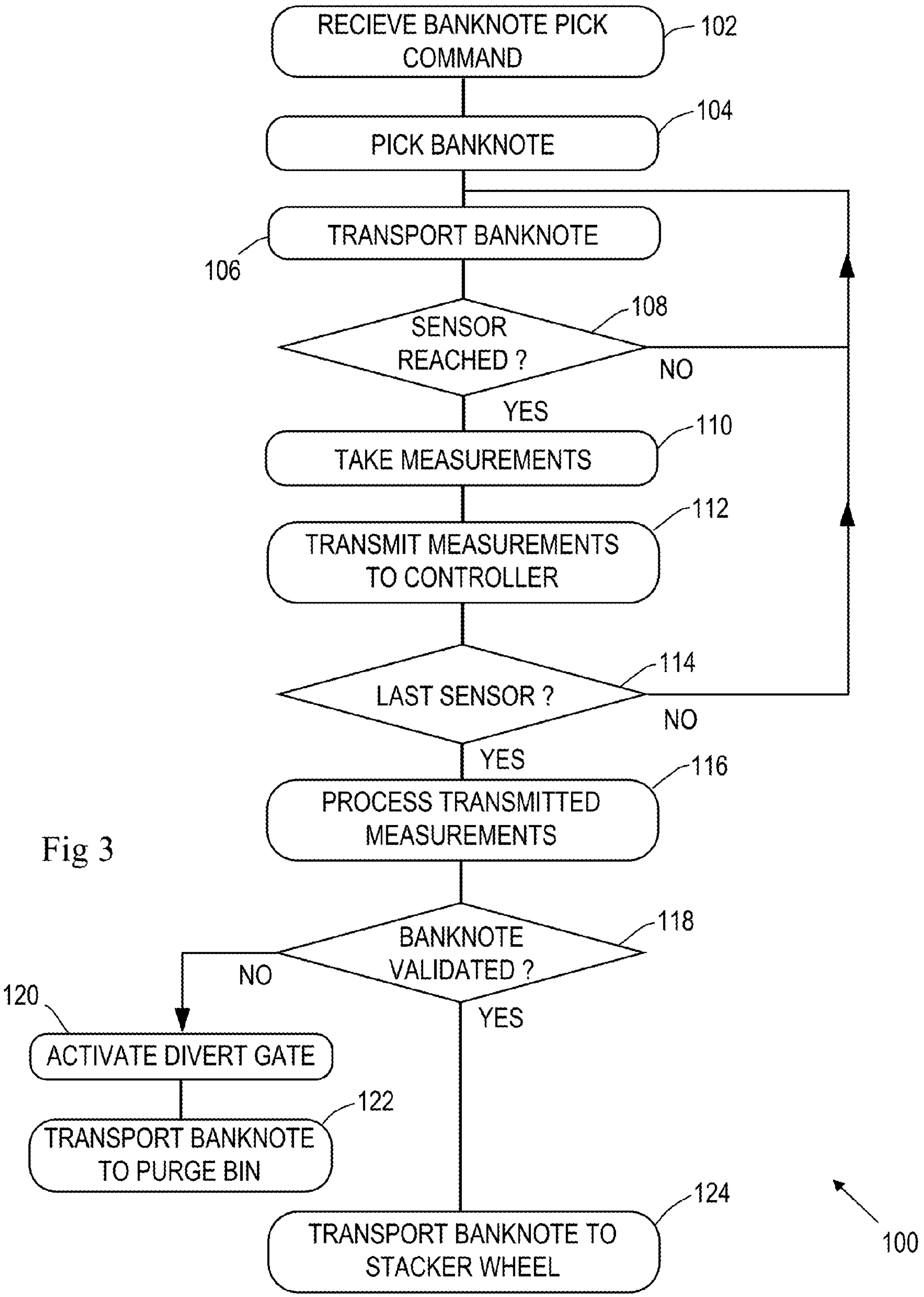
FIG. 3 is a flowchart illustrating the operation of the banknote dispenser of FIG. 1 when a banknote being dispensed is validated by the discrete sensors of FIG. 2.

The process 100 shown in FIG. 3 can be repeated until all required banknotes have been picked and loaded into the stacker wheel 18. The banknotes in the stacker wheel 18 can then be stripped off and presented as a bunch to a customer via exit port 28.

It should be appreciated that the controller 22 is programmed to reach a decision before the transported banknote 58 reaches the pivoting divert gate 36 so that a decision can be made to divert the banknote, if necessary.

The controller 22 may execute a real time operating system to enable it to process data within a defined time (that is, prior to a transported banknote reaching the pivoting divert gate 36).

Most counterfeit notes inserted into a currency cassette are low quality counterfeits, so it may be possible to detect these using a simple binary function applied to each of the discrete sensors (for example, presence or absence of infrared absorption for the first IR reflective transceiver 46*b*). Alternatively, if more accurate analysis is required then more complex validation algorithms may be used. For example, the controller 22 may use one or more of the algorithms described in U.S. Pat. Nos. 7,639,858 and 8,086,017, and the algorithms described in US published applications US 2008-0159614 and US 2008-0123931; all of which are assigned to the assignee of this application, and all of which are incorporated herein by reference.

This embodiment has the advantage that the ultrasonic sensor 40 is the first sensor that a banknote reaches. This means that even if the banknote includes a transparent window, the sensor will unambiguously detect the banknote; whereas, an optical sensor might not be able to differentiate between the window and the edge of a banknote.

Various modifications may be made to the above described embodiment within the scope of the invention, for example, in other embodiments, the dispenser may comprise a ballistic stacking dispenser.

In other embodiments, the media handler may comprise a recycler for receiving banknotes from a customer and dispensing the received banknotes to a subsequent customer.

In other embodiments, the media handler may comprise a greater or fewer number of discrete sensors than the six discrete sensors described above.

In the above embodiment, each discrete sensor conveyed a signal to the controller 22 for processing by the controller 22. In other embodiments, each discrete sensor may include a dedicated processor which outputs a digital signal indicating whether the media item is valid or invalid, based on the measurement recorded by that discrete sensor. In such embodiments, an OR Boolean function may be used to gate the outputs from each discrete sensor such that if even one discrete sensor indicates that the output is invalid then the media item is categorized as an invalid media item (for example, it may be categorized as a counterfeit or as a suspect counterfeit). The output of the dedicated processor may be an analogue signal, in which case additional processing would be performed on that output signal to ascertain if the media item is valid or invalid.

In the above embodiment, most of the discrete sensors are illustrated above the transport path. In other embodiments, most of the discrete sensors may below the transport path, or some of the discrete sensors may be above the transport path, others below the transport path, and others on either side of the transport path (for example, for a transmissive measurement).

In some embodiments, the transport path may be vertically oriented, rather than horizontally oriented as described in the above embodiment; in other words, media items may be transported on their edge (with their faces vertically aligned) rather than on their face (with their faces horizontally aligned). For a vertically oriented transport path, the discrete sensors may be on one or both sides of the transport path.

In other embodiments, different sensors may be used to those described above. For example, different types of sensors, different wavelengths of sensors, different numbers of sensors, different configurations of sensors may be used.

In other embodiments the discrete sensors may include a magnetic sensor or a metallic sensor.

In other embodiments, an iodine dropper could be provided on the transport path to apply some iodine to a banknote as it is being transported. Further downstream from the iodine dropper, an optical sensor may be provided to test the color of the iodine impregnated region on the banknote. Low quality counterfeit banknotes are typically printed on paper that includes starch, which reacts to iodine. The optical sensor could detect if the iodine has changed color (reacted with starch), thereby indicating that the banknote is a counterfeit.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A media handier for detecting counterfeit media, the media handler comprising:
- a removable media cassette;
- a pick unit that picks individual media items from the removable media cassette;
- a diverter;
- a plurality of discrete sensors distributed along a transport path when the transport path is vertically situated within the media handler, and the transport path operable to transport a media item from the pick unit to the diverter, wherein each of the discrete sensors is mounted on a corresponding circuit board separate from circuit boards of other discrete sensors, wherein each of the discrete sensors is laterally offset relative to at least one other discrete sensor for ensuring each sensor captures different aspects of the media item being transported along the transport path, wherein a first of the plurality of discrete sensors comprises an ultrasonic sensor to detect when the pick unit picks multiple media items, to detect a fraudulent composite banknote, and to provide media item detection even where the media item includes a transparent window, and wherein at least one sensor detects whether the item is skewed along the transport path instead of a track sensor;
- a plurality of position sensors mounted on a plurality of the circuit boards with the discrete sensors to detect positions of the media items along the transport path; and
- a controller operable to receive signals from the plurality of discrete sensors and to make a decision on validity of the transported media item based on the received signals wherein the discrete sensors comprise, are arranged, and ordered along the transport path: as an ultrasonic sensor, a first ultraviolet (UV) sensor, a green transmissive emitter/receiver pair sensor, a first Infrared (IR) sensor, a second IR sensor, and a second UV sensor, and wherein the circuit board for the IR sensor includes an IR transceiver and the circuit board is mounted laterally offset from the first UV sensor and the green transmissive emitter/receive pair sensor ensuring that different parts of the media item are measured by each of the sensors, and wherein the circuit board for the green transmissive emitter/receiver pair sensor includes a position sensor as a white Light Emitting Diode transceiver, and wherein each circuit board includes a dedicated processor that outputs a digital signal indicating whether the media items are valid or invalid after processing the media items as they pass along the transport path and when any of the sensors indicated a particular media item is invalid the diverter is activated to divert that particular media item to a purge container.

2. A media handler according to claim 1, wherein the media items determined to be valid comprise banknotes and the transport path further comprises a banknote dispense path to dispense those picked items determined to be valid to a customer.

3. A media handler according to claim 1, wherein the discrete sensors are distributed along the transport path, and in a first position the diverter routs the media item to the purge container and in a second position the diverter routs the media item to a stacker wheel.

4. A media handler according to claim 3, wherein a bunch of banknotes are stripped off the stacker wheel and presented as a bunch to a customer via an exit port.

5. A media handler according to claim 1, wherein a second of the discrete sensors comprises a dual function ultraviolet transceiver that operates to validate and to act as a complementary position sensor.

6. A media handler according to claim 1, wherein the discrete sensors comprise spot sensors.

7. A media handler according to claim 1, wherein one or more of the discrete sensors are used to complement a laterally spaced position sensor to detect if a transported media item is present.

8. A media handler according to claim 1, wherein the controller makes the decision on validity without slowing media item transport spread, and is operable to divert the transported media item if any of the discrete sensors indicates that the media item does not correspond to a valid media item.

9. A media handler according to claim 1, wherein media items determined to be valid comprise banknotes and the controller is operable to aggregate the signals received from the discrete sensors and apply artificial intelligence to ascertain if the media item is counterfeit as the media item is being transported.

10. A method of detecting counterfeit media, the method comprising:
- picking a media item from a removable media item container;
- sensing a first portion of the media item at a first vertical position on a transport path using a first circuit on a first circuit board utilizing an ultraviolet reflecting transceiver to detect when a pick unit picks multiple media items, and to detect fraudulent composite media items and to provide media item detection even where the media item includes a transparent window;
- transporting the media item to a second vertical position on the transport path;
- sensing a second portion of the media item laterally offset from the first portion at second position on the transport path using a second circuit on a second circuit board, wherein sensing the second portion further includes sensing the media item using at least two infrared (IR) sensors to detect the media item;
- transporting the media item to a third vertical position on the transport path;
- sensing a third portion of the media item laterally offset from at least one of the first and second vertical portions at the third vertical position on the transport path using a third circuit on a third circuit board, wherein the step of sensing the media item at a third position on the transport path using the third circuit includes the further step of using an ultrasonic sensor to detect the media item, and wherein the circuit board for each of the IR sensors includes an IR transceiver and the circuit board is mounted laterally offset from a first UV sensor, a green transmissive emitter/receiver pair sensor ensuring that different parts of the media item are measured by each of the sensors, and wherein the circuit board for the green transmissive emitter/receiver pair sensor includes a position sensor as a white Light Emitting Diode Transceiver, and wherein each circuit board includes a dedicated processor that outputs a digital signal indicating whether the media item is valid or invalid after processing the media item as they pass along the transport path, when any of the sensors indicate the media item is invalid the diverter is activated to divert the media item to a purge container; and diverting the media item to a reject container of the purge container in the event that any of the first, second, and third circuits indicates that the media item is counterfeit based on the digital signal being invalid.

11. A method of detecting counterfeit media according to claim 10, wherein the method further comprises the step of: diverting the media item to a reject container in the event that one of the circuits indicates that the media item comprises a plurality of media items being transported as a single item.

12. A method of detecting counterfeit media according to claim 10, wherein the ultraviolet reflecting transceiver provides media item detection where the media item includes a transparent window.

13. A cash dispenser comprising:

a removable banknote cassette;

a pick unit that picks individual banknotes from the removable banknote cassette;

a diverter; and a plurality of sensors mounted along multiple branches of a transport path and coupled to a controller operable to make a validity decision about a transported banknote based on outputs of the plurality of sensors while the banknote is being transported from the pick unit to the diverter via the multiple branches, to detect a fraudulent composite banknote and to provide media item detection even where the media item includes a transparent window, wherein the transport path is vertically situated when passing by the sensors wherein the discrete sensors comprise, are arranged, and ordered along the transport path: as an ultrasonic sensor, a first ultraviolet (UV) sensor, a green transmissive emitter/receiver pair sensor, a first Infrared (IR) sensor, a second IR sensor, and a second UV sensor, and wherein a circuit board for the IR sensor includes an IR transceiver and the circuit board is mounted laterally offset from the first UV sensor and the green transmissive emitter/receiver pair sensor ensuring that different parts of the media items are measured by each of the sensors, wherein the circuit board for the green transmissive emitter/receiver pair sensor includes a position sensor as a white Light Emitting Diode transceiver, and wherein each of the circuit boards includes a dedicated processor that outputs a digital signal indicating whether the media items are valid or invalid after processing the media items as they pass along the transparent path, when any of the sensors indicated a particular media item is invalid the diverter is activated to divert that particular media item to a purge container.

* * * * *